(12) United States Patent
Beeler et al.

(10) Patent No.: US 8,737,925 B2
(45) Date of Patent: May 27, 2014

(54) METHOD FOR THE CONTROL OF A WIRELESS COMMUNICATIONS LINK FOR MITIGATING ADJACENT SATELLITE INTERFERENCE

(75) Inventors: Michael Beeler, Jefferson, MD (US); Jeffery Harig, Mesa, AZ (US); Wallace Davis, Scottsdale, AZ (US); Frederick Morris, Gathersburg, MD (US); Cris Mamaril, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 280 days.

(21) Appl. No.: 13/162,483

(22) Filed: Jun. 16, 2011

(65) Prior Publication Data

US 2011/0269396 A1 Nov. 3, 2011

Related U.S. Application Data

(60) Provisional application No. 61/451,196, filed on Mar. 10, 2011.

(51) Int. Cl.
*H04B 1/00* (2006.01)

(52) U.S. Cl.
USPC ............ 455/63.1; 455/24; 455/266; 455/522; 455/523; 455/108; 455/102; 455/423; 455/62; 455/69; 455/572; 375/219; 375/13; 375/321; 375/104; 375/50; 370/335; 370/320; 370/11; 370/341; 370/261

(58) Field of Classification Search
USPC ......... 455/63.1, 24, 266, 522, 13.4, 108, 102, 455/523, 423, 62, 69, 572, 127, 561, 403, 455/67.3, 126; 375/219, 13, 321, 104, 50, 375/95, 30, 58, 84, 60, 94, 68, 101.1, 18; 370/335, 320, 11, 341, 261, 265, 262, 370/316, 340, 346, 348, 349

See application file for complete search history.

(56) References Cited

U.S. PATENT DOCUMENTS

| 5,507,025 | A  | * | 4/1996  | Rodeffer       | 455/266  |
|-----------|----|---|---------|----------------|----------|
| 5,625,624 | A  | * | 4/1997  | Rosen et al.   | 370/307  |
| 5,734,962 | A  | * | 3/1998  | Hladik et al.  | 455/12.1 |
| 6,075,969 | A  | * | 6/2000  | Lusignan       | 455/3.02 |
| 6,308,080 | B1 | * | 10/2001 | Burt et al.    | 455/522  |
| 6,356,539 | B1 | * | 3/2002  | Zuliani et al. | 370/320  |
| 7,136,620 | B2 |   | 11/2006 | Wang           |          |
| 8,125,288 | B2 | * | 2/2012  | Castle et al.  | 332/151  |
| 8,346,162 | B1 | * | 1/2013  | Jayasimha et al. | 455/13.1 |

(Continued)

*Primary Examiner* — Edward F. Urban
*Assistant Examiner* — Ganiyu A Hanidu
(74) *Attorney, Agent, or Firm* — Booth Udall Fuller, PLC (57) ABSTRACT

A method for remotely and dynamically controlling adjacent satellite interference comprising monitoring one or more off-axis signals emitted by one or more remote transmitters; determining whether one or more of the off-axis signals is creating adjacent satellite interference (ASI), off axis emissions and inband interference that is higher than a predetermined level of acceptable interference, and transmitting a control signal to at least one of the one or more remote transmitters in response to the determination that the one or more off-axis signals is creating interference that is higher than the predetermined level of acceptable interference, the control signal initiating an adjustment to one or more transmission parameters of the one or more remote transmitters such that interference resulting from the one or more off-axis signals emitted by the one or more remote transmitters is reduced or eliminated.

18 Claims, 9 Drawing Sheets

(56) References Cited

U.S. PATENT DOCUMENTS

| | | | |
|---|---|---|---|
| 2002/0061073 A1* | 5/2002 | Huang et al. | 375/295 |
| 2005/0085186 A1 | 4/2005 | Sandrin | |
| 2005/0181731 A1* | 8/2005 | Asghar et al. | 455/63.1 |
| 2006/0040614 A1* | 2/2006 | Chapelle et al. | 455/13.4 |
| 2007/0026795 A1* | 2/2007 | de La Chapelle | 455/13.4 |
| 2009/0022088 A1 | 1/2009 | Wahlberg et al. | |
| 2011/0009055 A1 | 1/2011 | Miller | |

\* cited by examiner

METHOD FOR THE CONTROL OF A WIRELESS COMMUNICATIONS LINK FOR MITIGATING ADJACENT SATELLITE INTERFERENCE

CROSS REFERENCE TO RELATED APPLICATIONS

This document claims the benefit of the filing date of U.S. Provisional Patent Application No. 61/451,196, entitled "A Method for Adaptive Control of Modulation, Forward Error Correction (FEC) Rate Coding, Power, Spreading and Bandwidth for the Control of a Wireless Communications Links for Mitigating Adjacent Satellite Interference (ASI) and Overcoming Inband Interference" to Michael Beeler, et al., which was filed on Mar. 10, 2011, the disclosure of which is hereby incorporated entirely by reference herein.

BACKGROUND

1. Technical Field

Aspects of this document relate generally to telecommunication systems and techniques for transmitting data across a telecommunication channel.

2. Background Art

With the introduction of Communication on the Move (COTM) or Communications on the Pause (COTP) systems, commonly referred to as mobile terminal(s), there is a growing need and great concern to control the level of interference caused by small aperture antennas. Additionally, small-aperture static terminals exhibit the same interference issues, so both a mobile and a static terminal will generically be referred to as "terminals." Interference that may be caused by the terminals may be in the form of Adjacent Satellite Interference (ASI), where the terminal's small aperture antenna produces a wide beam width resulting in adjacent satellites being illuminated, thereby resulting in interference to services on adjacent satellites. Larger antennas produce narrower beam widths, but they are generally used less in mobile or nomadic applications.

Additionally, a terminal attempting to communicate over a satellite link may become degraded or interfered with by other terminals, both correctly assigned and not correctly assigned to their bandwidth, resulting in interference that degrades the communication path to the point where the terminal may not reliably operate in the given bandwidth that has been assigned.

SUMMARY

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

According to a first aspect of the disclosure, a method for remotely and dynamically controlling adjacent satellite interference may comprise monitoring one or more off-axis signals emitted by one or more remote transmitters, determining whether one or more of the off-axis signals is creating adjacent satellite interference (ASI) that is higher than a predetermined level of ASI, and transmitting a control signal to at least one of the one or more remote transmitters in response to the determination that the one or more off-axis signals is creating ASI that is higher than the predetermined level of ASI, the control signal initiating an adjustment to one or more transmission parameters of the one or more remote transmitters such that ASI resulting from the one or more off-axis signals emitted by the one or more remote transmitters is reduced or eliminated.

Particular implementations may comprise one or more of the following features and/or steps. The monitoring may occur on one or more satellites adjacent to a predetermined satellite to which one or more signals is to be transmitted. At least one of the one or more transmission parameters may be a power spectral density of the one or more signals transmitted by the one or more remote transmitters. The power spectral density of the one or more signals may be adjusted by changing a modulation index. The power spectral density of the one or more signals may be adjusted by changing a forward error correction rate. The power spectral density of the one or more signals may be adjusted by changing a spread factor. The power spectral density of the one or more signals may be adjusted by changing a signal bandwidth. The power spectral density of the one or more signals may be adjusted by changing a center frequency. The power spectral density of the one or more signals may be disabled.

According to a second aspect of the disclosure, a method for dynamically controlling transmission parameters for reducing inband interference may comprise monitoring one or more signals emitted by one or more remote transmitters, determining whether inband interference exists from at least one of the one or more remote transmitters that is higher than a predetermined level of inband interference, and automatically transmitting a control signal to the remote transmitter in response to a determination that the inband interference is higher than the predetermined level of inband interference, the control signal adjusting one or more transmission characteristics of the one or more remote transmitters such that the inband interference is reduced.

Particular implementations may comprise one or more of the following features and/or method steps. The one or more remote transmitters may all be located within a common network and may be configured to communicate among the one or more remote transmitters. The one or more signals monitored may be off-axis signals and the monitoring may occur on one or more satellites adjacent to a predetermined satellite to which the one or more signals is to be transmitted. At least one of the one or more transmission parameters may be a power spectral density of the one or more signals transmitted by the one or more remote transmitters. At least one of the one or more transmission parameters may be a modulation index. At least one of the one or more transmission parameters may be a forward error correction rate. At least one of the one or more transmission parameters may be a spread factor. At least one of the one or more transmission parameters may be a signal bandwidth. At least one of the one or more transmission parameters may be a center frequency.

According to a third aspect of the disclosure, a system for remotely and dynamically controlling adjacent satellite interference may comprise a monitoring device configured to monitor one or more off-axis signals emitted by a remote transmitter and determine whether one or more of the off-axis signals is creating adjacent satellite interference (ASI) that is higher than a predetermined level of ASI, and a transmitter configured to automatically transmit a control signal to the remote transmitter in response to a determination that the one or more off-axis signals is creating ASI that is higher than the predetermined level of ASI, the control signal configured to adjust one or more transmission parameters such that ASI resulting from the one or more off-axis signals emitted by the remote transmitter is reduced or eliminated.

Particular implementations may comprise one or more of the following features and/or components. The monitoring device may be located on one or more satellites adjacent to a predetermined satellite to which one or more signals is to be transmitted. At least one of the one or more transmission parameters may be a power spectral density of the one or more signals transmitted by the remote transmitter. The control signal may be further configured to adjust the power spectral density of the one or more signals is adjusted by changing a modulation index. The control signal may be further configured to adjust the power spectral density of the one or more signals by changing a forward error correction rate. The control signal may be further configured to adjust the power spectral density of the one or more signals by changing a spread factor. The control signal may be further configured to adjust the power spectral density of the one or more signals by changing a signal bandwidth. The control signal may be further configured to adjust the power spectral density of the one or more signals by changing a center frequency. The power spectral density of the one or more signals may be disabled.

According to a fourth aspect of the disclosure, a system for dynamically controlling transmission parameters for reducing inband interference may comprise a monitoring device configured to monitor one or more signals emitted by a remote transmitter and determine whether inband interference exists that is higher than a predetermined level of inband interference, and a transmitter configured to transmit a control signal to the remote transmitter in response to a determination that the inband interference is higher than the predetermined level of inband interference, the control signal configured to adjust one or more transmission parameters such that the inband interference is reduced.

Particular implementations may comprise one or more of the following features and/or components. The one or more remote transmitters may all be located within a common network and are configured to communicate among the one or more remote transmitters. The monitoring device may be located on one or more satellites adjacent to a predetermined satellite to which the one or more signals is to be transmitted and may further be configured to monitor one or more off-axis signals. At least one of the one or more transmission parameters may be a power spectral density of the one or more signals transmitted by the remote transmitter. At least one of the one or more transmission parameters may be a modulation index. At least one of the one or more transmission parameters may be a forward error correction rate. At least one of the one or more transmission parameters may be a spread factor. At least one of the one or more transmission parameters may be a signal bandwidth. At least one of the one or more transmission parameters may be a center frequency.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, power control, modulation, coding or spreading, or methods disclosed herein. Many additional components and assembly procedures known in the art consistent with a method for adaptive control of modulation, Forward Error Rate (FEC) coding, power, spreading, and bandwidth for the control of a wireless communications links for mitigating Adjacent Satellite Interference (ASI) and overcoming inband interference are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

The described methods provide a mechanism for adaptively mitigating the ASI produced by a transmission terminal by adaptively controlling the modulation index, Forward Error Rate (FEC) coding, uplink power, spread factor, and/or bandwidth. Each parameter may be adjusted alone or in concert to mitigate ASI by the terminal or mitigate degraded link conditions or interference by another terminal to achieve reliable communications.

The methods described herein are intended to provide the ability for someone skilled in the art, for example, a communications software or test engineer, network operator, equipment manufacturer or other communications and network specialist to utilize the described methods.

This disclosure relates to, but is not limited to, methods for adaptively controlling the modulation, Forward Error Correction (FEC) rate coding, power, spreading, and bandwidth for a communications link for the mitigation of ASI caused by communication devices such as mobile terminals and the ability to overcome degraded link conditions or interference (intentional or unintentional) by other terminals. The term adaptive, when introduced into a communications link, is not new in the art. As an example of existing art, the European Telecommunications Standards Institute (ETSI) EN 302 307, the contents of which is herein incorporated entirely by reference, introduces a method knows as Adaptive Coding and Modulation (ACM) where the modulation may range from Quaternary Phase-Shift Keying (QPSK) to 32-Amplitude Phase-Shift Keying (32-APSK) modulation and the Forward Error Correction (FEC) may be adjusted in concert to provide operation at a Symbol Energy to Noise Density, commonly represented in the art as Es/No, expressed in decibels ($10*Log_{10}(Es/No)$). As a second example of existing art, the wireless terrestrial (mobile phone) industry uses a technique known as Orthogonal Variable-Spreading-Factor (OVSF) where orthogonal spreading codes and spread factors are distributed to compensate for changing conditions. A final example of existing art is WO 2008/129509 A1 to Shiron Satellite Communications, Ltd., the contents of which is herein incorporated by reference, that describes a Method and Apparatus for Compensation for Weather Based Attenuation in a Satellite Link.

Link degradation is presently addressed in the art, but there is no compensation for dynamically addressing the ASI contribution or overcoming interference in a dynamic fashion with the exception of beam forming as described in U.S. Pat. No. 5,754,138 by Turcotte, et al, the disclosure of which is herein incorporated by reference. In the described art, the antenna patterns are fixed and there are no coefficients to be altered for changing the electromagnetic beam (radiation pattern of the antenna).

Therefore, given that the antenna's beam configuration is a fixed pattern from the terminal, addressing the contribution of ASI and overcoming the interference may be done through the use of adjusting the transmission parameters in particular implementations of the described methods.

The described methods provide an approach for both addressing and controlling the Adjacent Satellite Interference (ASI) contributed by a remote terminal as well as inband interference caused by interfering carriers within the same bandwidth of the terminal under control using these methods. Particular implementations described herein may employ digital signal processing (DSP) techniques such as, but not limited to, power control, modulation, coding and spreading techniques which can easily be implemented in, but are not limited to, a Field-Programmable Gate Array (FPGA), Programmable Logic Device (PLD), Programmable Integrated Circuit (PIC), Digital Signal Processor (DSP), Application Specific Integrated Circuit (ASIC) or microprocessors.

Particular implementations of a method for adaptive control of modulation, Forward Error Correction (FEC) rate coding, power, spreading, and bandwidth for the control of a wireless communications links for mitigating Adjacent Satellite Interference (ASI) and overcoming inband interference as disclosed herein may be specifically employed in satellite communications systems. However, as it will be clear to those of ordinary skill in the art from this disclosure, the principles and aspects disclosed herein may readily be applied to any electromagnetic (IF, RF and optical) communications system, such as cellular phone or terrestrial broadcast network without undue experimentation.

The ability to dynamically provide feedback to a transmission network to modify the transmission parameters is not a novel concept. For traditional transmission networks that employ dynamic power control or adaptive coding and modulation methods currently in use in the existing art, the parameters are limited to one, two or three moments of movement, e.g. power control, modulation and coding or spread factor. The described methods may take advantage of up to five moments of movement to address the ASI (inbound from the terminal) and inband interference (inbound from the terminal) in a dynamic fashion. Although smaller antennas' electromagnetic (EM) beam widths are wider than larger antennas, the use of smaller antennas is becoming more common. An embodiment of a method is also described herein to address the drawbacks of using these wider beam width antennas.

Some embodiments of the described methods do not limit the feedback channel to using the same medium as the desired channel. In a particular embodiment, both the forward and return channel paths are over the same medium, but this is not a requirement. Instead, the forward path may be over a satellite link, and the return channel may be via a terrestrial microwave link, terrestrial connection, and optical connection or in the most primitive method a visual signal. Techniques such as spread spectrum or embedded spread spectrum may be used.

Figure 1:
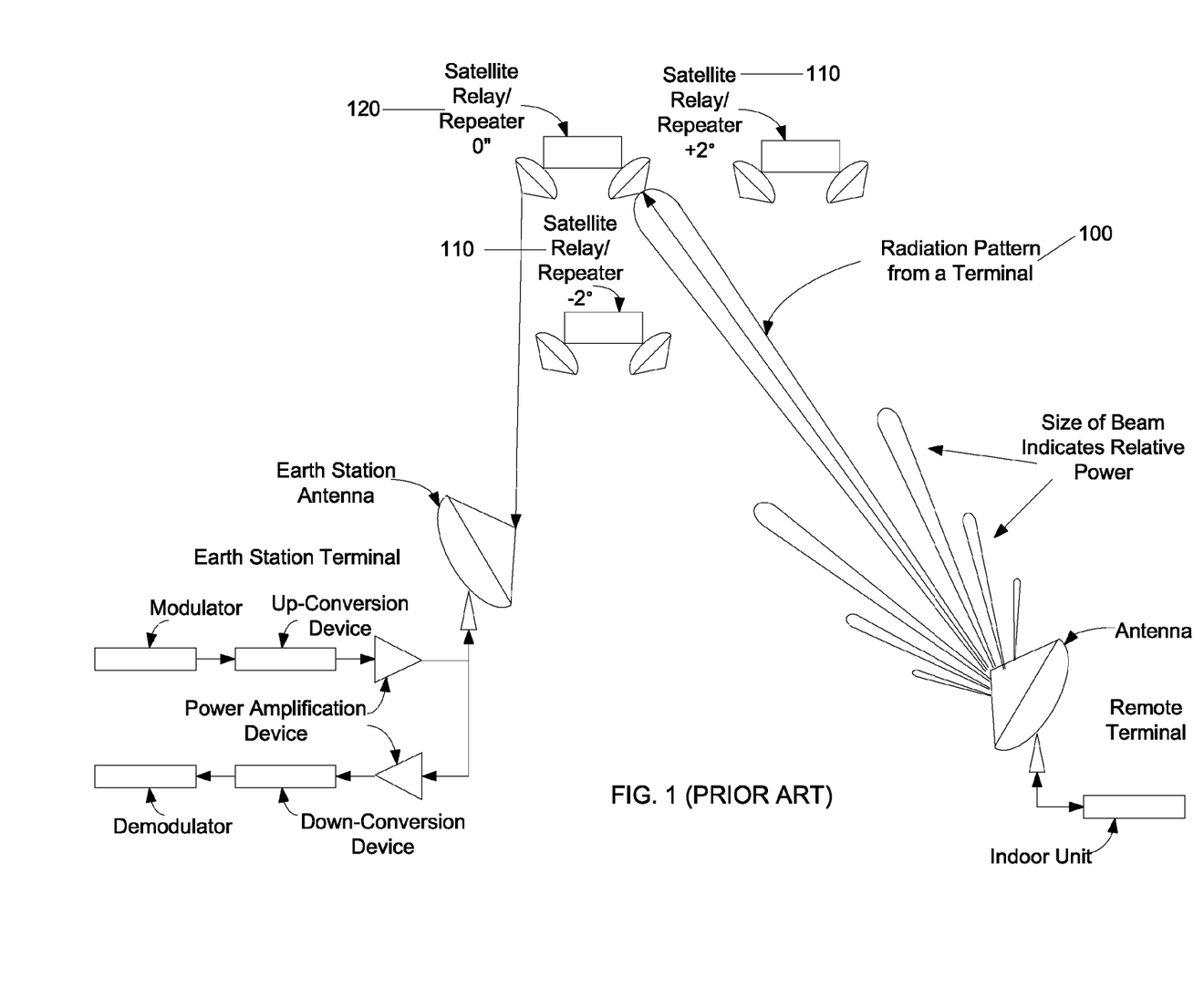
FIG. 1 depicts the prior art having fixed transmission parameters in which the resulting radiation pattern does not cause ASI.

FIG. 1 shows a traditional wireless satellite network in the existing art supporting communications between remotely-distributed communications locations. This type of satellite link is without the ability to dynamically monitor, address or correct the ASI or inband interference, and is designed for the a priori worst case conditions. In most cases, the worst case conditions are established to provide a link available in the $99^{th}$ percentile. Once the communications configuration is set, the terminal operates with no regard to correcting transmission or impairment issues that may be experienced. Fixed communications sites are typically designed to operate in this fashion. Thus, when conditions change and a terminal exceeds acceptable limits for operation, no corrective action results. For a COTM or COTP terminal, as the terminal is in motion or is reconfigured, changes may take place resulting in improper operation. In a statically configured network, a single terminal may cause ASI resulting in interference to services that are not associated with the terminal's mission. For mobile terminal applications, this manner of operation may be problematic, since the terminal may be in motion or moving from location to location, and may be changing transmission parameters as it does so. As shown, the result of transmission in FIG. 1 is a fixed radiation pattern 100 having radiation to the adjacent satellite 110 being below the required regulatory limits, thus providing an acceptable amount of ASI to the satellites to the left and right of the desired satellite 120 in the boresight. Satellites 110 are shown as spaced −2 degrees and +2 degrees from the desired satellite 120. This is the minimum spacing allowed in the orbital arc over North America for Ku-band.

Figure 2:
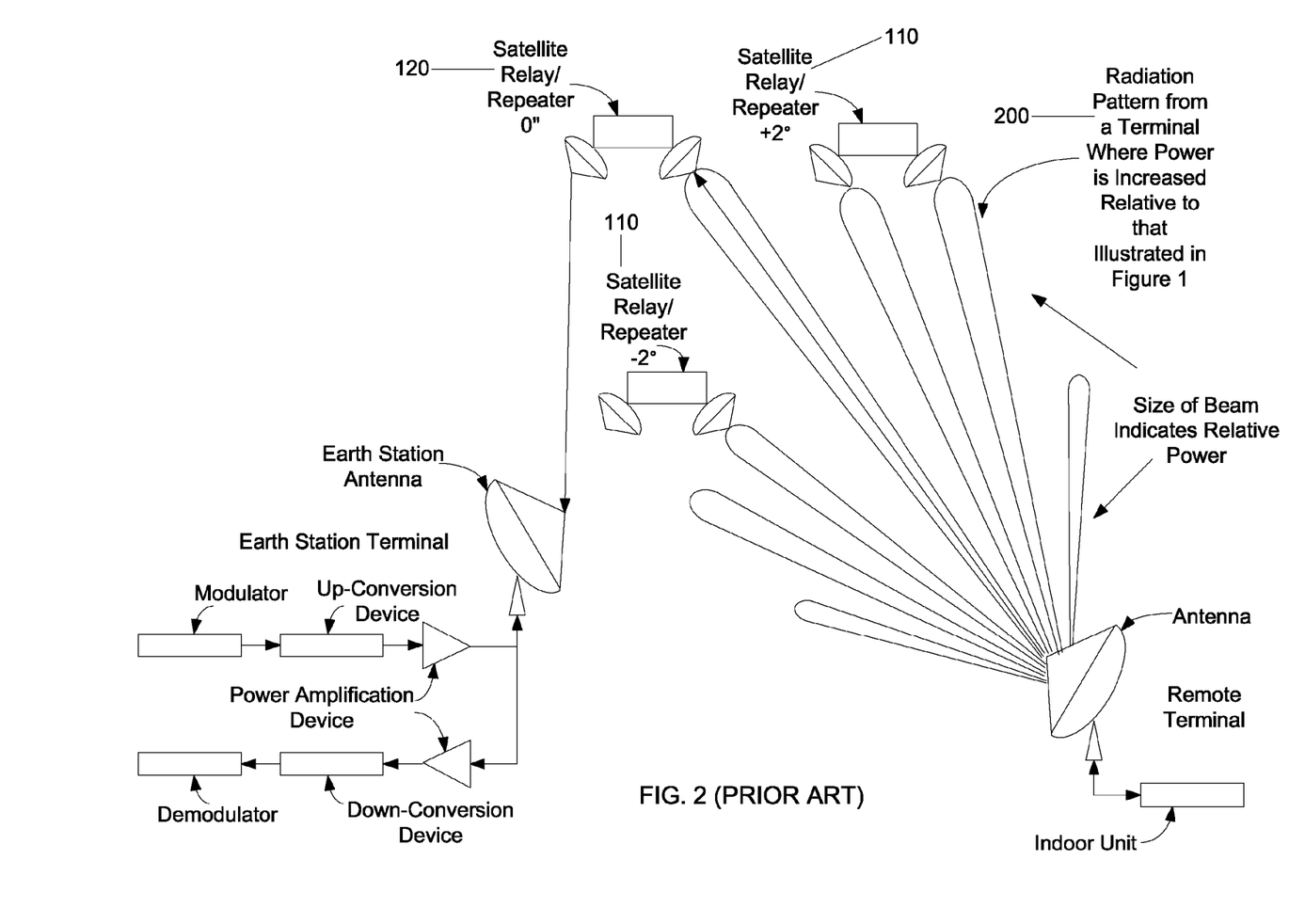
FIG. 2 depicts the prior art having fixed parameters in which the resulting radiation pattern does cause ASI.

FIG. 2 shows the prior art where all the parameters are fixed and the resulting radiation pattern 200 is fixed, resulting in radiation to the adjacent satellites 110 rising above the desired or required regulatory limits, thus exceeding the ASI to the satellites to the left and right of the desired satellite 120 in the boresight. The result is interference with the adjacent satellites 110, since the side lobe energy is operating above an acceptable limit, resulting in energy being injected into the adjacent satellites 110 above an acceptable established regulatory limit. The prior art does not address the ASI caused by these terminals in a manner other than by beam forming.

Figure 3:
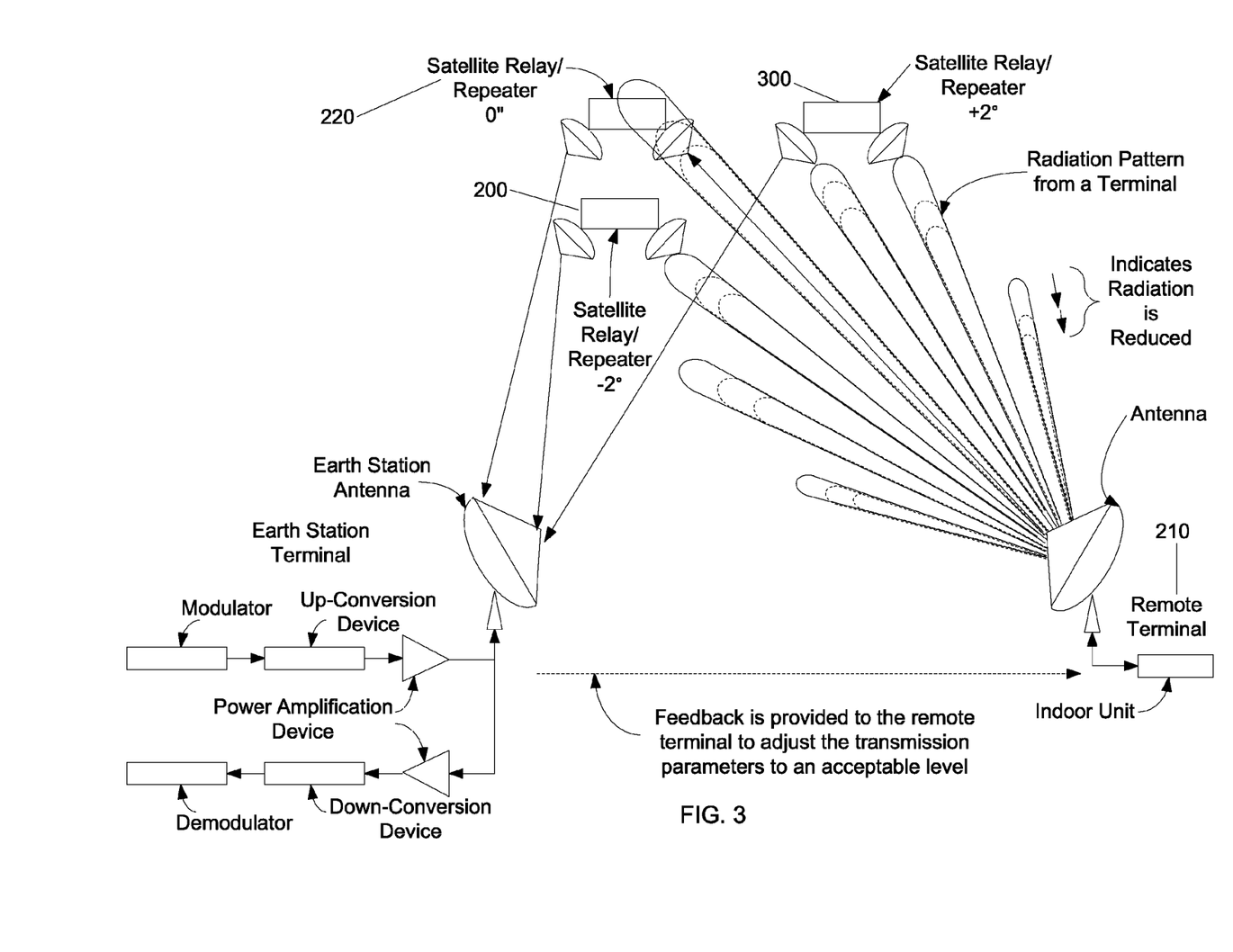
FIG. 3 shows an implementation of a method of measuring ASI on adjacent satellites and adjusting transmission parameters to reduce ASI.

FIG. 3 shows an implementation of the described methods in which the ASI caused by a transmission from a remote terminal 210 is measured on satellites 300 that are adjacent to the desired satellite 220 and transmission parameters are adjusted to lower the ASI to an acceptable level so as to reduce or eliminate interference. This adjustment may include removal of transmission power. A feedback path is provided to dynamically control the transmission characteristics from the terminal to address the ASI and inband interference mitigation. In one application, this feedback path may also be used to turn off the transmission power of the terminal. Implementations may use spread spectrum or embedded spread spectrum technology in transporting the communications signal.

Figure 4:
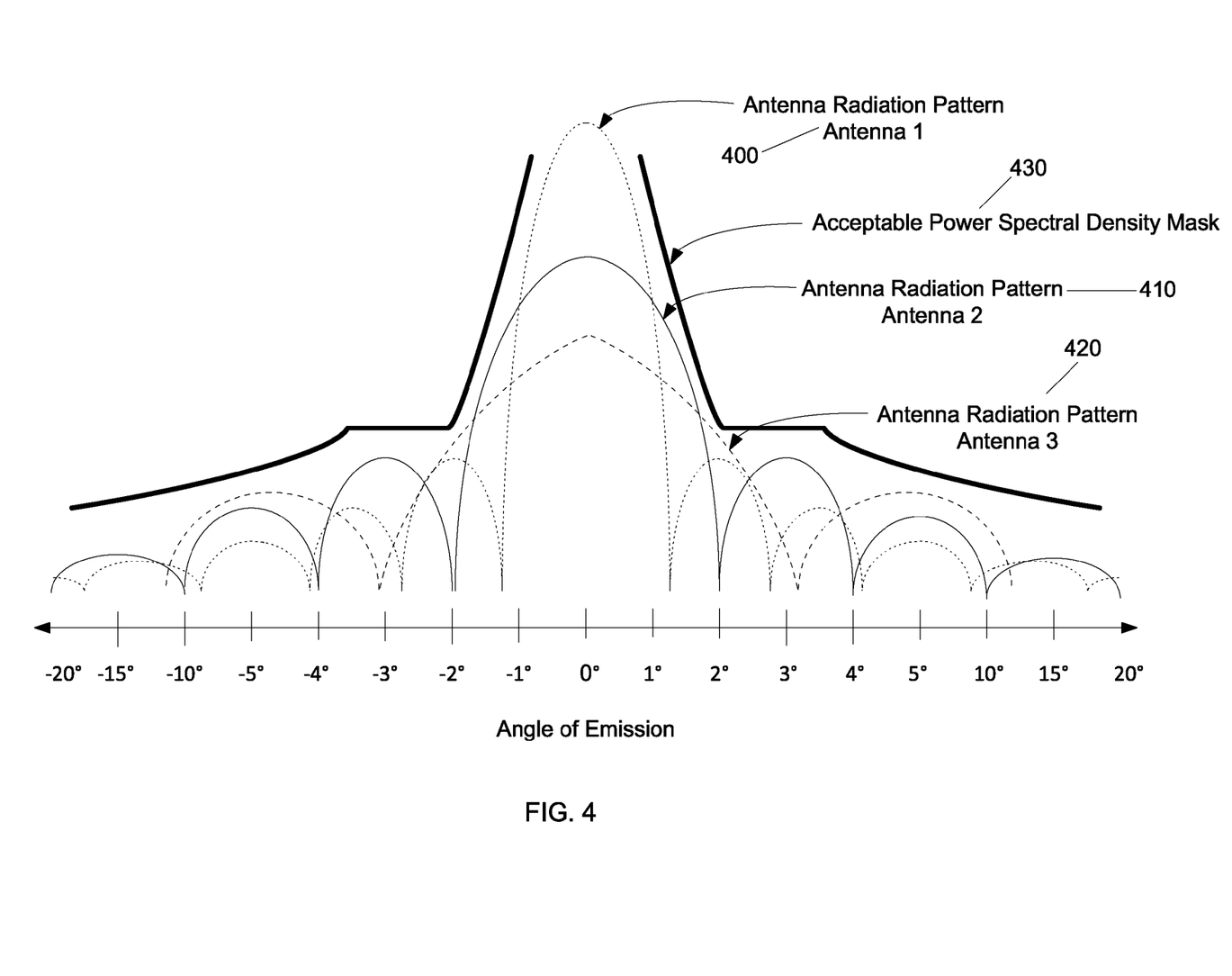
FIG. 4 shows a plurality of radiation patterns from various antennas.

FIG. 4 shows three different antenna configurations such that the radiation patterns are different for each type of antenna. The antenna patterns 400, 410, 420 shown may be the same size and geometry, but the use of different manufacturing techniques creates a difference in how a resulting beam pattern appears from each antenna. As shown, the power spectral density (PSD) mask 430 contains the main lobe pointing at the boresight and the side lobes. As can be observed, given the different radiation patterns 400, 410, 420 from the antennas, no single configuration or static configuration can solve the problem. Using an implementation of the described method, the radiation pattern of the antenna becomes less of a concern, since the dynamic monitoring and control ensures the terminal's radiation pattern from the antenna will be kept to an acceptable level. It is noteworthy that the narrower the antenna's beam into boresight the "sharper" or more directive the antenna is considered to be.

Figure 5:
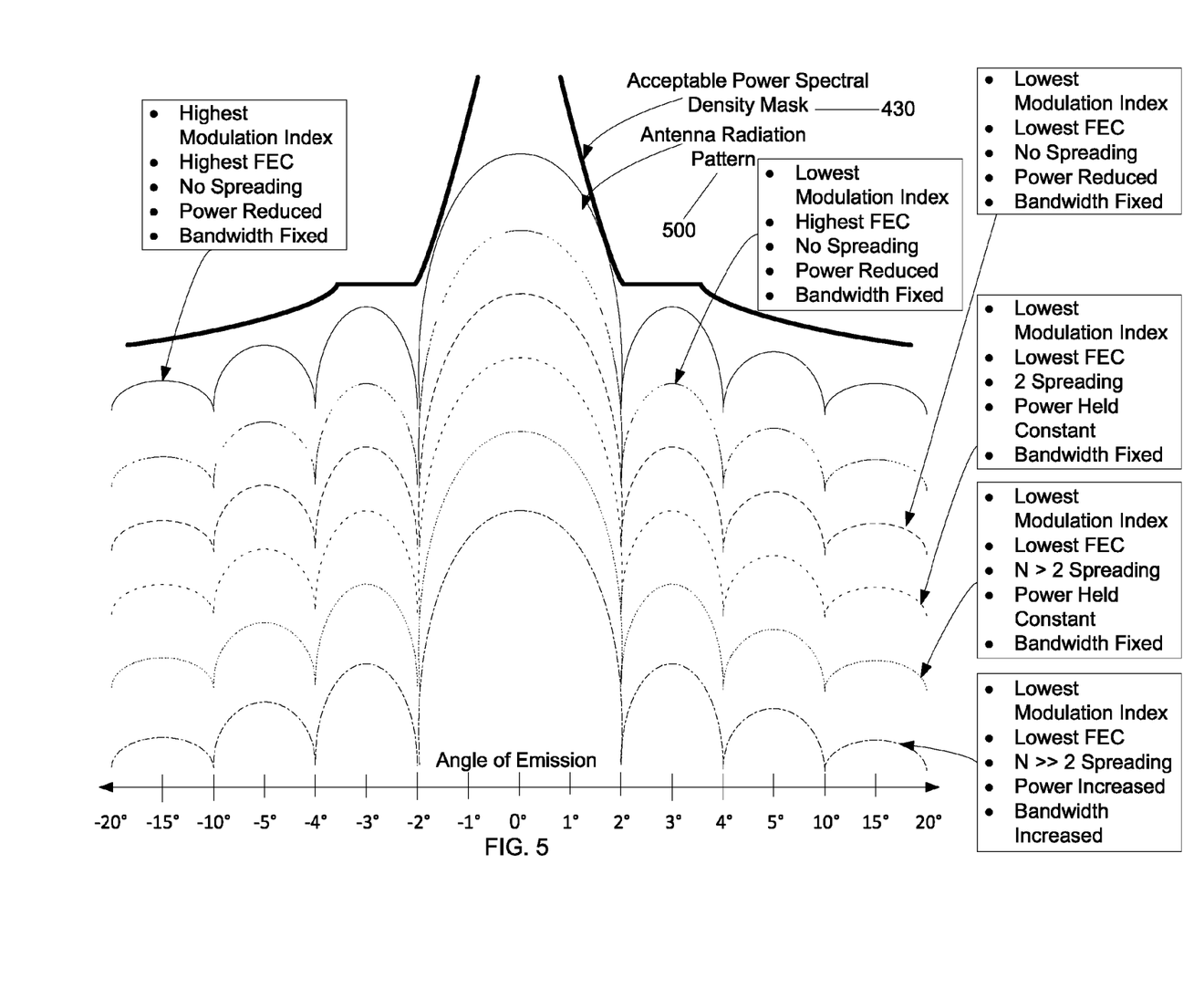
FIG. 5 shows a typical antenna emissions plot with a power spectral density (PSD) mask in which the main lobe pointing at the boresight and the side lobes are contained under the PSD mask.

FIG. 5 shows a typical power spectral density (PSD) mask 430 in which the main lobe of the antenna radiation pattern 500 is pointing at the boresight and the side lobes are all contained under the PSD mask 430. Shown in FIG. 5 are the results of using an implementation of the disclosed method to alter the transmission parameters from the transmitting terminal thereby reducing the power level of the off axis emissions to prevent or reduce the ASI in a dynamic fashion.

Figure 6:
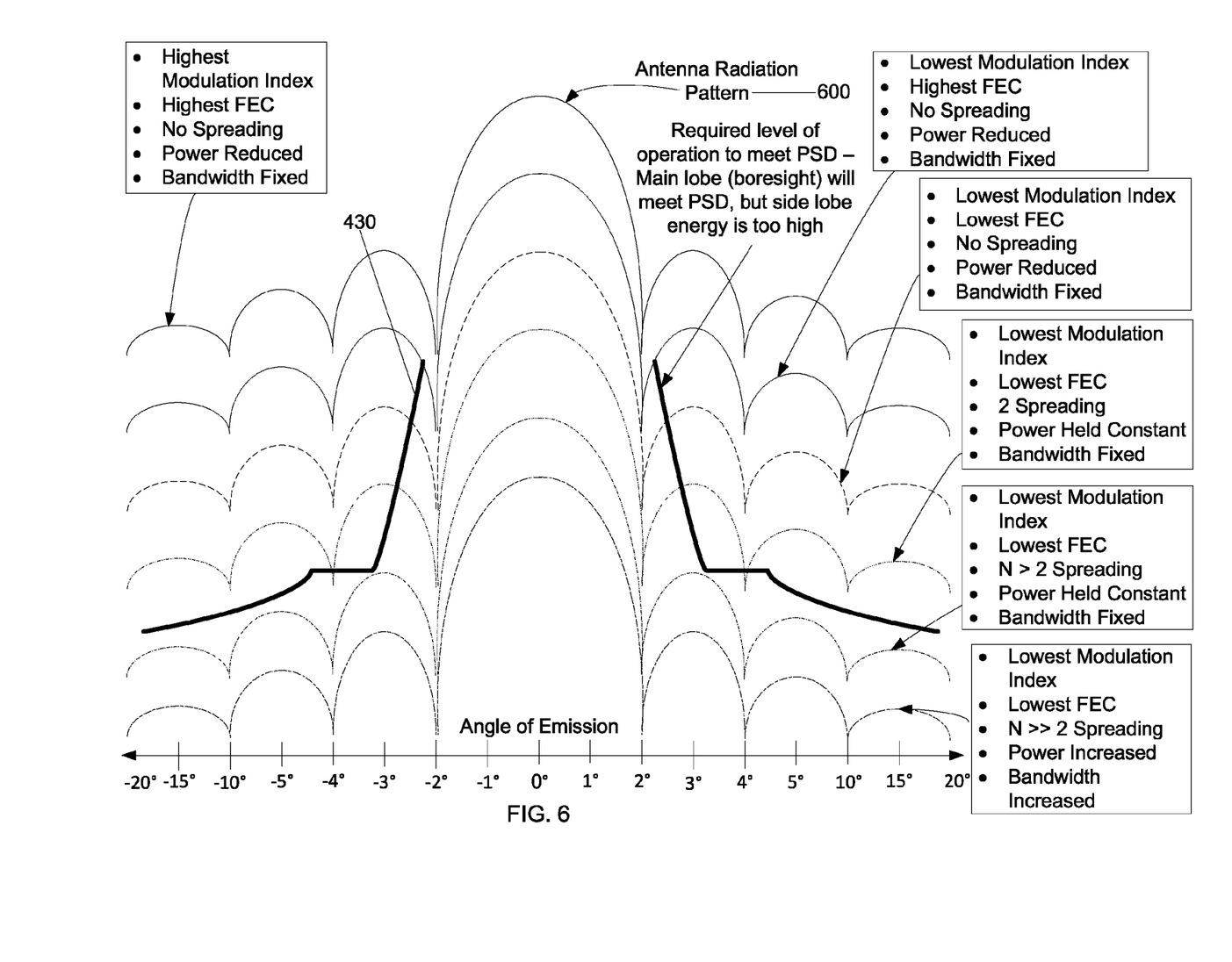
FIG. 6 shows an antenna emissions plot resulting from an antenna in which transmission exceeds the PSD mask and an antenna emissions plot for an implementation of a method of increasing signal bandwidth while changing modulation, coding, power, and spreading parameters to reduce ASI.

FIG. 6 shows the radiation pattern 600 of a terminal in which the transmission power exceeds the PSD mask 430. This pattern results when the output power of the antenna is higher than the allowed or desired limit. Using an implementation of the described method, a combination of any or all of the modulation, FEC coding, power and/or spread factor may be modified to lower the ASI. For example, as shown, some configurations of transmission parameters result in the main lobe (boresight) to fall within the PSD mask 430 while the side lobe energy is still too high to be contained within the PSD mask 430. In this circumstance, an increase in bandwidth and spreading may be required to reduce the power level so that all lobes fall within the PSD mask 430.

Currently in the art, the modulation index is reduced from a high order modulation such as 32-Amplitude Phase-Shift Keying (32-APSK) to the next lower modulation index such as 16-APSK, 8-PSK or even Quaternary Phase-Shift Keying (QPSK). Additionally, another moment of movement is the FEC coding. As link conditions are degrading, the FEC is reduced. The modulation and coding (MODCOD) are reduced in concert until the lowest available MODCOD is reached. An example of the use of adaptive control is defined in the European Telecommunications Standards Institute (ETSI) EN 302 307 and in WIPO 2008/129509 A1 by Shiron Satellite Communications, the disclosures of which are herein incorporated entirely by reference. Thus, in conventional systems, a method may provide a range of movement of no more 20 dB of compensation and addresses only the link degradation and not the resulting ASI or interference.

As a specific example of how the PSD may be managed, assume a system is configured to operate with a maximum input power density of −14 dBW/4 kHz as recommended by the Federal Communications Commission (FCC) for mobile terminal operation in the United States. In the prior art, the terminal is configured to ensure the −14 dBW/4 KHz is maintained, but this limits the operation of the terminal in a manner that at no time can the power be increased or set dynamically to be increased or decreased to overcome link degradations. A particular embodiment of the described methods continually monitors the terminal's transmission to ensure the terminal is transmitting at optimal power, but not so high that it results in adjacent satellite interference. Assuming the maximum PSD provided by the terminal is −14 dBW/4 KHz and the spectral mask follows an example of:

15−10 Log(N)−25 Log ΘdBW/4 KHz for $1.5° \leq \Theta \leq 7°$
−6−10 Log(N) dBW/4 kHz for $7° \leq \Theta \leq 9.2°$
18−10 Log(N)−25 Log ΘdBW/4 kHz for $9.2° \leq \Theta \leq 48°$
−24−10 Log(N)dBW/4 kHz for $48° \leq \Theta \leq 85°$
−14−10 Log(N)dBW/4 kHz for $85° \leq \Theta \leq 180°$ The resulting limits are shown as the PSD limits on FIGS. 4 through 6. To adjust the PSD to be below the desired limits, each parameter may be adjusted and the resulting changes are shown in the following examples:

Example 1 is a non-limiting example of how the modulation index may be adjusted resulting in the following correction to the PSD:

32-APSK to 16-APSK: PSD is lowered by 3.0 dB
16-APSK to 8PSK: PSD is lowered by 3.0 dB
8 PSK to QPSK: PSD is lowered by 3.0 dB
QPSK to BPSK: PSD is lowered by 3.0 dB Therefore the PSD may be lowered by the modulation index by a range of 12.0 dB.

Example 2 is a non-limiting example for the Forward Error Correction (FEC) coding of how a generic FEC code may be adjusted resulting in the following correction to the PSD:

9/10 FEC to 3/4 FEC: PSD is lowered by approximately 3.0 dB
3/4 FEC to 1/2 FEC: PSD is lowered by approximately 3.0 dB
1/2 FEC to 1/4 FEC: PSD is lowered by approximately 3.0 dB Example 3 is a non-limiting example of how the Spread Factor may be adjusted resulting in the following correction to the PSD:

No spreading to a spread factor of 2: PSD is lowered by 3.0 dB
Spread factor of 2 to 4: PSD is lowered by 3.0 dB
Spread factor of 4 to 8: PSD is lowered by 3.0 dB As can be observed in Examples 1 through 3, the PSD may be adjusted to meet most PSD requirements.

An example of an extreme case is shown in Example 4, where the PSD cannot be lowered enough through normal means, so the bandwidth may be increased while signal spreading is implemented.

Example 4 is a non-limiting example of bandwidth being increased while all other parameters are held constant:

Bandwidth is increased by 2: PSD is lowered by 3.0 dB
Bandwidth is increased by 4: PSD is lowered by 3.0 dB As can be observed, the PSD may be adjusted by any one of the many parameters. Unlike an active antenna where the coefficients may be adjusted to reform (reconfigure) the beam, static antennas such as grid, parabolic, passive patch, etc. antennas cannot adjust (reform/reconfigure) their beams—only the entire power level may be adjusted to compensate for the PSD of the antenna.

The identification of the carriers on an adjacent satellite may be aided by carrier identification technology as described in U.S. application Ser. No. 13/024,402 to Beeler, et al., filed Feb. 10, 2011 and entitled "Embedded Meta-Carrier with Spread Spectrum via Overlaid Carriers", and U.S. application Ser. No. 13/044,446, to Beeler, et al., filed Mar. 9, 2011 and entitled "Embedded Meta-Carrier with Spread Spectrum for Periodic-Burst Carriers via Overlaid Carriers", the disclosures of which are hereby incorporated in their entireties by this reference.

Figure 7:
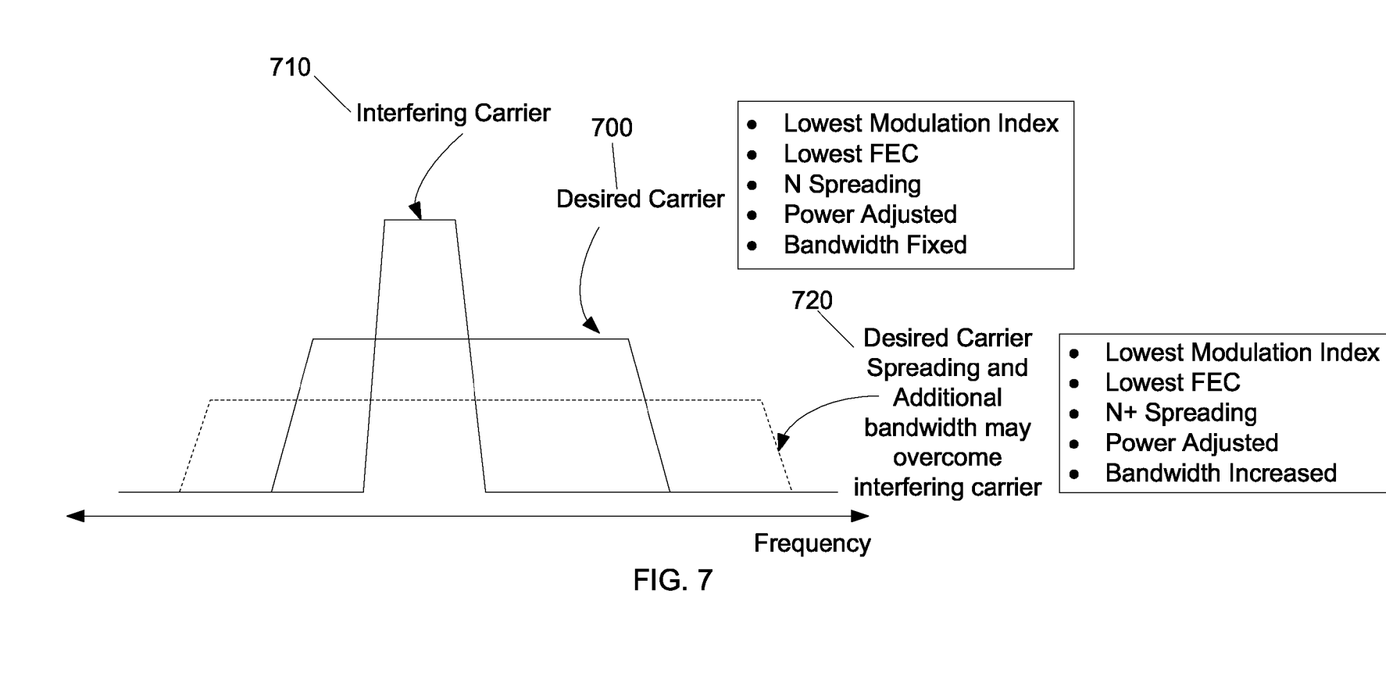
FIG. 7 shows the result of an implementation of a method of overcoming inband interference by increasing occupied signal bandwidth and using spread spectrum technology.

Additionally, FIG. 7 shows how a particular embodiment of the methods may be used to overcome inband interference. As part of the monitoring feature for the ASI, the inband interference may be monitored resulting in this embodiment being used to overcome link degradation due to interference or deteriorating conditions. In the event the desired signal 700 is being interfered with 710, the method may adjust the modulation, coding, power, spreading and bandwidth of the desired signal in an attempt to overcome the inband interference resulting in an altered desired carrier 720. As an example, increasing the bandwidth while using spread spectrum technology may result in overcoming inband interference.

Figure 8:
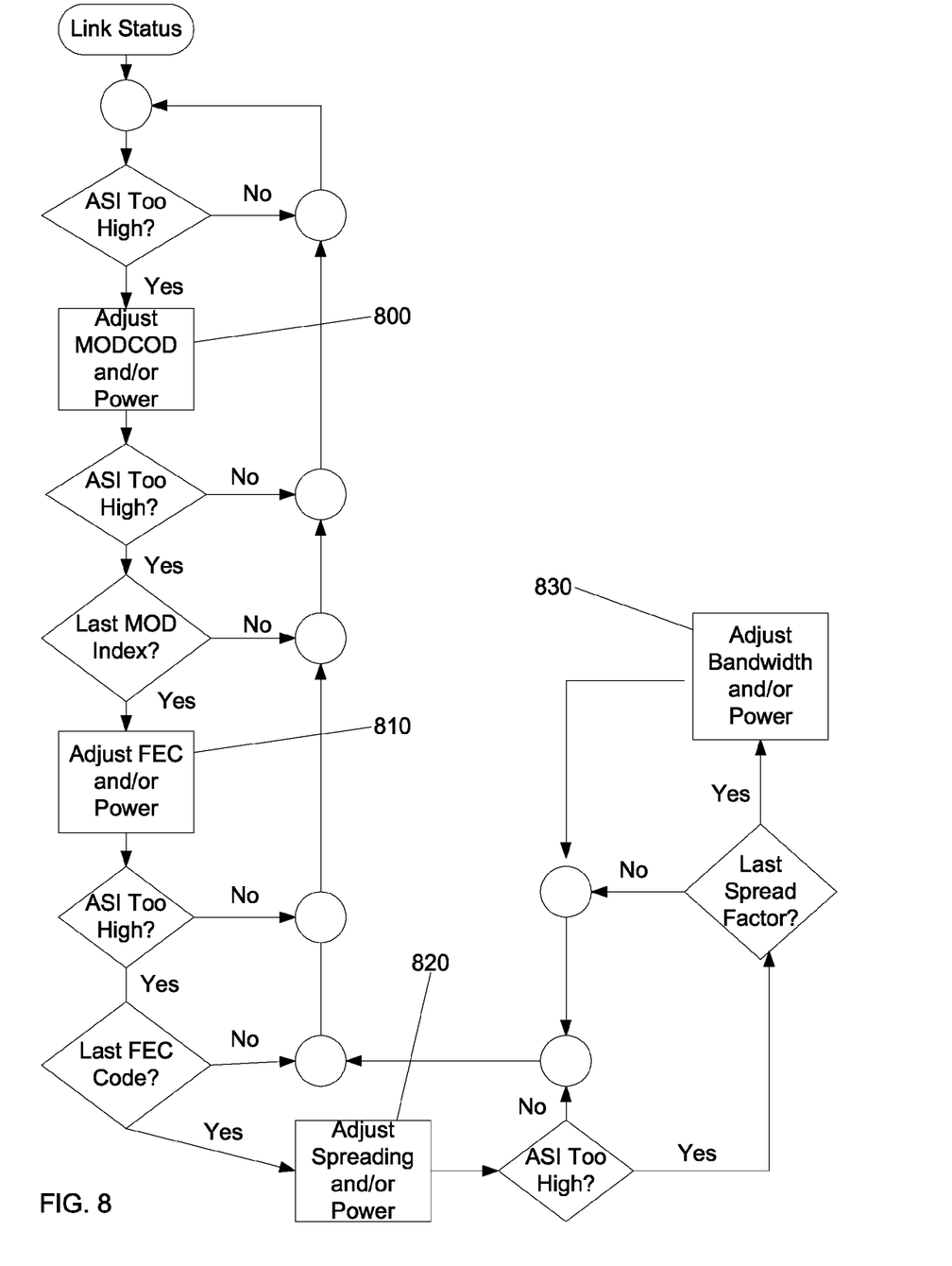
FIG. 8 is a logic flow diagram of an implementation of a method of reducing ASI interference.

FIG. 8 shows an implementation of a logic flow that may be brought to bear for iteratively attempting to address the PSD being monitored. As FIG. 8 demonstrates, the logic attempts to exhaust the modulation index 800 first, FEC rates 810 and spread factors 820. In particular implementations as illustrated through FIG. 8, the power may be constantly adjusted to find the optimal value that lowers the PSD to an acceptable level. In the final iterations, the bandwidth 830 of the terminal's carrier may be adjusted with the spread factor and power as a final attempt to control the emission from the terminal. In one extreme example, this feedback path may also be used to turn off the transmission power of the terminal. This may use spread spectrum or embedded spread spectrum as the method of communications transport.

Figure 9:
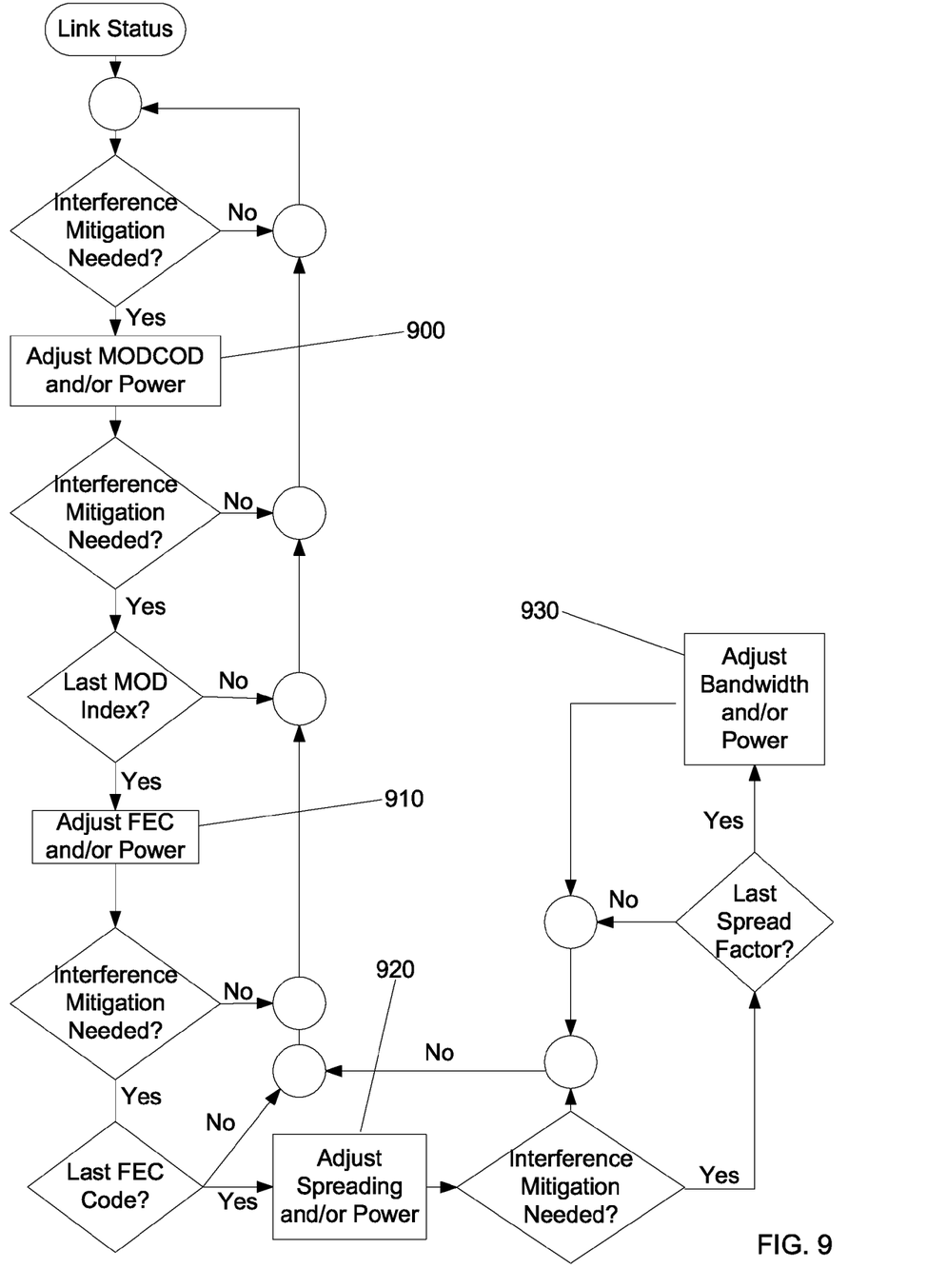
FIG. 9 is a logic flow diagram of an implementation of a method of reducing inband interference.

FIG. 9 shows an implementation of a logic flow that may be brought to bear for iteratively attempting to address the inband interference. As FIG. 9 demonstrates, the logic attempts to exhaust the modulation index first 900, FEC rates 910 and spread factors 920. In particular implementations, the power may be constantly adjusted to find the optimal value that overcomes the inband interference. In the final iterations, the bandwidth 930 of the terminal's carrier may be adjusted with the spread factor and power as a final attempt to overcome the inband interference experienced by the terminal. In one extreme example, this feedback path may also be used to turn off the transmission power of the terminal. This may use spread spectrum or embedded spread spectrum as the method of communications transport.

Since interference may be viewed as a form of degradation, any one of the following parameters may be brought to bear to address inband interference. As interference is experienced, the modulation index, FEC coding, power, spread factor or bandwidth may be adjusted to overcome interference resulting in link degradation.

Particular embodiments and implementations of the described methods are not limited to a single direction in the traditional sense where a large earth station is transmitting to a remote station (fixed or mobile), but may be implemented in either or both directions across the link.

Through continued monitoring as the remote site provides feedback on the status of the received signal, the link parameters may be adjusted to provide optimal conditions.

The following are particular implementations of a method for adaptive control of modulation, Forward Error Correction (FEC) rate coding, power, spreading, and bandwidth for the control of a wireless communications links for mitigating Adjacent Satellite Interference (ASI) and overcoming inband interference and are provided as non-limiting examples:

Example 1

A small aperture mobile terminal is operating using a geostationary satellite. A monitoring station using an embodiment of a described method is monitoring the emissions from the terminal on the desired satellite and the adjacent satellites. The monitoring station determines the remote terminal is exceeding the power spectral density for proper operation and the resulting emissions are beyond the specified limits and thus, is causing interference on an adjacent satellite. The monitoring station instructs the mobile terminal to adjust the modulation index and associated power to correct the PSD on the adjacent satellite.

Example 2

As described in Example 1, the mobile terminal has adjusted the modulation index to the lowest modulation index, but the monitoring station determines the PSD is beyond the specified limits and thus, is causing interference on an adjacent satellite. The monitoring station instructs the mobile terminal to adjust the FEC rate and associated power to correct the PSD on the adjacent satellite.

Example 3

As described in Example 1, the mobile terminal has adjusted the FEC rate to the lowest FEC rate, but the monitoring station determines the PSD is beyond the specified limits and thus, is causing interference on an adjacent satellite. The monitoring station instructs the mobile terminal to adjust the spread factor and associated power to correct the PSD on the adjacent satellite.

Example 4

As described in Example 1, the mobile terminal has adjusted the spread factor to the highest spread factor, but the monitoring station determines the PSD is beyond the specified limits and thus, is causing interference on an adjacent satellite. The monitoring station instructs the mobile terminal to increase the bandwidth, spread factor and associated power to correct the PSD on the adjacent satellite.

Example 5

As described in Example 1, the monitoring station can constantly adjust power in an attempt to reverse the changes to lower the PSD in an attempt to increase the parameters resulting in restoring higher data throughput.

Example 6

As described in Example 1, the center frequency may be moved to a frequency that may result in lower interference to adjacent satellites.

Example 7

As described in Example 1, the monitoring station can turn off the transmission power of the mobile terminal.

Example 8

A small aperture terminal is operating using a geostationary satellite. A monitoring station using an embodiment of a described method is monitoring the emissions from the terminal. The monitoring station determines the remote terminal is receiving inband interfered which is resulting in a degraded signal from the terminal. The monitoring station instructs the terminal to adjust the modulation index and associated power to overcome the inband interference without causing ASI due to exceeding the PSD.

Example 9

As described in Example 8, the terminal has adjusted the modulation index to the lowest modulation index, but the monitoring station determines the terminal still may not overcome the interference or is causing ASI using the modulation index changes. The monitoring station instructs the terminal to adjust the FEC rate and associated power to overcome the inband interference while monitoring the PSD on the adjacent satellite.

Example 10

As described in Example 8, the terminal has adjusted the FEC rate to the lowest FEC rate, but the monitoring station determines the terminal still may not overcome the interference or is causing ASI using the FEC rate changes. The monitoring station instructs the terminal to adjust the spread factor and associated power to overcome the inband interference while monitoring the PSD on the adjacent satellite.

Example 11

As described in Example 8, the terminal has adjusted the spread factor to the highest spread factor, but the monitoring station determines the interference cannot be overcome or is causing interference on an adjacent satellite. The monitoring station instructs the terminal to increase the bandwidth, spread factor and associated power to overcome the inband interference while monitoring the PSD on the adjacent satellite.

Example 12

As described in Example 8, the monitoring station can constantly adjust power in attempt to reverse the changes to overcome the inband interference and PSD in an attempt to increase the parameters resulting in restoring higher data throughput.

Example 13

As described in Example 8, the center frequency may be moved to a frequency that may result in lower interference to adjacent satellites.

Example 14

As described in Example 8, the monitoring station can turn off the transmission power of the mobile terminal.

The invention claimed is:

1. A method for remotely and dynamically controlling adjacent satellite interference, the method comprising:
   monitoring one or more off-axis signals emitted by one or more remote transmitters;
   determining whether one or more of the off-axis signals is creating adjacent satellite interference (ASI) that is higher than a predetermined level of ASI; and
   transmitting a control signal via a feedback path to at least one of the one or more remote transmitters in response to the determination that the one or more off-axis signals is creating ASI that is higher than the predetermined level of ASI, the control signal initiating an adjustment to one or more transmission parameters other than a transmit power of the one or more remote transmitters such that ASI resulting from the one or more off-axis signals emitted by the one or more remote transmitters is reduced or eliminated at the one or more remote transmitters as a result of the adjustment of the one or more transmission parameters.

2. The method of claim 1, wherein the monitoring occurs on one or more satellites adjacent to a predetermined satellite to which one or more signals is to be transmitted.

3. The method of claim 1, wherein at least one of the one or more transmission parameters is a power spectral density of the one or more signals transmitted by the one or more remote transmitters.

4. The method of claim 3, wherein the power spectral density of the one or more signals is adjusted by changing a modulation index.

5. The method of claim 3, wherein the power spectral density of the one or more signals is adjusted by changing a forward error correction rate.

6. The method of claim 3, wherein the power spectral density of the one or more signals is adjusted by changing a spread factor.

7. The method of claim 3, wherein the power spectral density of the one or more signals is adjusted by changing a signal bandwidth.

8. The method of claim 3, wherein the power spectral density of the one or more signals is adjusted by changing a center frequency.

9. The method of claim 3, wherein the power spectral density of the one or more signals is disabled.

10. A system for remotely and dynamically controlling adjacent satellite interference comprising:
- a monitoring device configured to monitor one or more off-axis signals emitted by a remote transmitter and determine whether one or more of the off-axis signals is creating adjacent satellite interference (ASI) that is higher than a predetermined level of ASI; and
- a transmitter configured to automatically transmit a control signal via a feedback path to the remote transmitter in response to a determination that the one or more off-axis signals is creating ASI that is higher than the predetermined level of ASI, the control signal configured to adjust one or more transmission parameters other than a transmit power of the remote transmitter such that ASI resulting from the one or more off-axis signals emitted by the remote transmitter is reduced or eliminated at the one or more remote transmitters as a result of the adjustment of the one or more transmission parameters.

11. The system of claim 10, wherein the monitoring device is located on one or more satellites adjacent to a predetermined satellite to which one or more signals is to be transmitted.

12. The system of claim 10, wherein at least one of the one or more transmission parameters is a power spectral density of the one or more signals transmitted by the remote transmitter.

13. The system of claim 12, wherein the control signal is further configured to adjust the power spectral density of the one or more signals is adjusted by changing a modulation index.

14. The system of claim 12, wherein the control signal is further configured to adjust the power spectral density of the one or more signals by changing a forward error correction rate.

15. The system of claim 12, wherein the control signal is further configured to adjust the power spectral density of the one or more signals by changing a spread factor.

16. The system of claim 12, wherein the control signal is further configured to adjust the power spectral density of the one or more signals by changing a signal bandwidth.

17. The system of claim 12, wherein the control signal is further configured to adjust the power spectral density of the one or more signals by changing a center frequency.

18. The system of claim 12, wherein the power spectral density of the one or more signals is disabled.

* * * * *